United States Patent
Dawson et al.

(10) Patent No.: US 9,569,206 B1
(45) Date of Patent: Feb. 14, 2017

(54) CREATING OPTIMIZED SHORTCUTS

(71) Applicant: International Business Machines Corporation, Armonk, NY (US)

(72) Inventors: Michael H. Dawson, Ottawa (CA); Jinghua Feng, Kanata (CA); Daniel J. Heidinga, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/868,843

(22) Filed: Sep. 29, 2015

(51) Int. Cl.
*G06F 9/44* (2006.01)
*G06F 9/45* (2006.01)

(52) U.S. Cl.
CPC . *G06F 8/71* (2013.01); *G06F 8/20* (2013.01); *G06F 8/443* (2013.01); *G06F 8/4441* (2013.01); *G06F 9/4431* (2013.01)

(58) Field of Classification Search
CPC ....... G06F 8/443; G06F 8/4441; G06F 9/4431
USPC ......................................................... 717/162
See application file for complete search history.

(56) References Cited

U.S. PATENT DOCUMENTS

| 8,397,225 B2 | 3/2013 | Barsness et al. |
| 2005/0149912 A1* | 7/2005 | Farcy .................... G06F 9/3808 717/124 |
| 2010/0077072 A1 | 3/2010 | Guruswamy et al. |
| 2012/0054725 A1 | 3/2012 | Inglis et al. |
| 2014/0096116 A1 | 4/2014 | Öhrstrom |
| 2015/0220375 A1* | 8/2015 | Pacejo .................... G06F 9/547 719/330 |

OTHER PUBLICATIONS

Nutter, "Invokedynamic in JRuby: Constant Lookup," Headius, http://blog.headius.com/2011/08/invokedynamic-in-jruby-constant-lookup.html, Aug. 10, 2011, pp. 1-7.
Oracle, "Class Method Handles," Method Handles (Java Platform SE 7 ), http://docs.oracle.com/javase/7/docs/api/java/lang/invoke/MethodHandles.html, printed on Feb. 13, 2015, pp. 1-14.

* cited by examiner

*Primary Examiner* — John Chavis
(74) *Attorney, Agent, or Firm* — Erik K. Johnson

(57) ABSTRACT

An embodiments of the invention may include a method, computer program product and computer system for optimizing computer programs. The embodiment may include a computing device that determines a program code of a computer program contains at least two consecutive method handles. The embodiment may determine that the at least two consecutive method handles can be optimized. The embodiment may optimize the at least two consecutive method handles. Optimizing the at least two consecutive method handles may include one or more of: replacing the at least two consecutive method handles with one or more different commands; and reordering the at least two consecutive method handles.

17 Claims, 3 Drawing Sheets

CREATING OPTIMIZED SHORTCUTS

BACKGROUND

This disclosure relates generally to optimize Java 7 and more specifically to optimize the performance of method handles in Java 7.

In computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other. A good API makes it easier to develop a program by providing all the building blocks. A programmer then puts the blocks together.

Method handles were introduced into the Java® (Java is a registered trademark of Oracle Corp.) language API with Java 7.0. A method handle is a typed, directly executable reference to an underlying method, constructor, field, or similar low-level operation, with optional transformations of arguments or return values. These transformations are quite general, and include such patterns as conversion, insertion, deletion, and substitution. Such method handle commands allow developers to write a program that includes a call to a function that is not present when the program is initially compiled. The method handles look up the functions at run time, based on the name of the called function.

Included in the method handle API is the guard with test command. Guard with test functions as an if-statement. For example, the command: "MethodHandles.guardwithtest (MethodHandle test, MethodHandle target, MethodHandle fallback)" would execute method handle target if method handle test returned true, and would execute method handle fallback if method handle test returned false.

BRIEF SUMMARY

An embodiments of the invention may include a method, computer program product and computer system for optimizing computer programs. The embodiment may include a computing device that determines a program code of a computer program contains at least two consecutive method handles. The embodiment may determine that the at least two consecutive method handles can be optimized. The embodiment may optimize the at least two consecutive method handles. Optimizing the at least two consecutive method handles may include one or more of: replacing the at least two consecutive method handles with one or more different commands; and reordering the at least two consecutive method handles.

BRIEF DESCRIPTION OF THE SEVERAL DRAWINGS

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Program inefficiencies may be the result of unnecessary commands being called or used during operation. Such commands may not be routinely performed, or may be performed in a manner that is computationally intensive, so each check of such a command may decrease the performance. To combat this decrease in performance, such commands may be reordered or replaced so that the most efficient path may be taken through a set of checks. By replacing or reordering a group of commands, the optimized command or commands, would lead to a decrease in the amount of underlying byte codes performed on the processor or stored in program memory.

Figure 1:
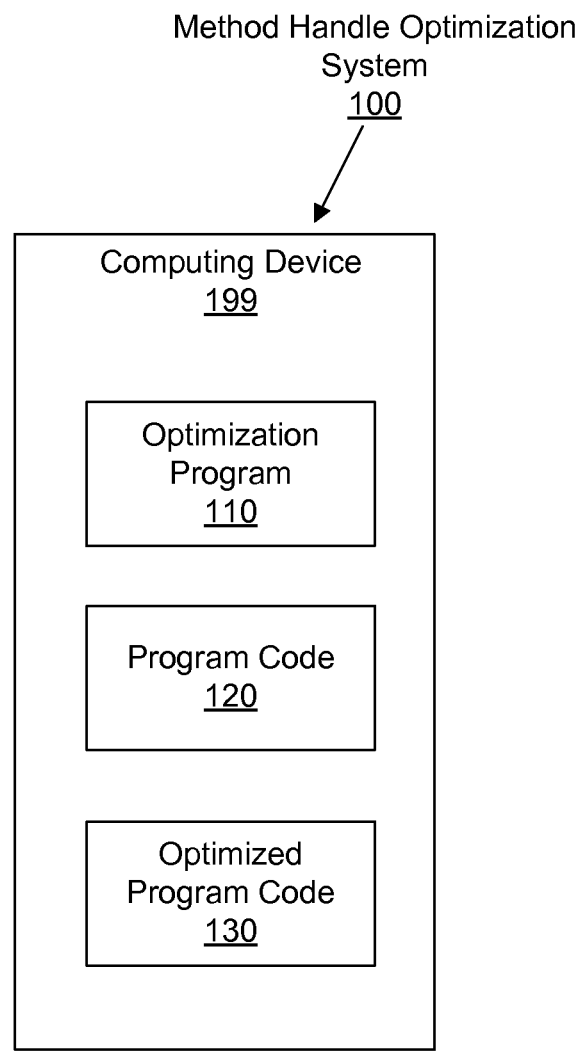
FIG. 1 illustrates a method handle optimization system, in accordance with an embodiment of the invention.

With reference to FIG. 1, a block diagram of a method handle optimization system 100, in accordance with various embodiments of the disclosure is presented. In the example embodiment, method handle optimization system 100 includes computing device 199.

Computing device 199 includes optimization program 110, program code 120 and optimized program code 130. Computing device 199 may be a desktop computer, a notebook, a laptop computer, a tablet computer, a handheld device, a smart-phone, a thin client, or any other electronic device or computing system capable running and optimizing Java scripts. Although not shown, optionally, computing device 199 can comprise a cluster of web servers executing the same software to collectively process the requests for the web pages as distributed by a front end server and a load balancer. Additionally, while optimization program 110, program code 120 and optimized program code 130 are shown as being co-located on the same computing device, each component may be located on separate computing devices in communication with each other. Computing device 199 is described in more detail with reference to FIG. 3.

Optimization program 110 is a software application or configuration in a software application capable of analyzing and optimizing a program code 120 or an optimized program code 130, both further described below. Optimization program 110 is capable of determining which portions, or method handles, of the program code 120 or an optimized program code 130 are run most frequently, and pointing out those portions as needing optimization. Additionally, the optimization program 110 may determine the portions of script that are capable of being optimized, and then carry out the optimization by re-ordering the method handles, or by replacing a group of method handles with a more efficient command structure. The operations and functions of optimization program 110 are described in further detail below with regard to FIG. 2.

Program code 120 may be source code for a program written in the Java programming language. The program code 120 may be a list of commands placed in a specific order, which when executed, perform a specific operation in a Java environment. In the example embodiment, the program code 120 may be Java 7.0, or later, JRuby or any other programming language where method handles are implemented in the API. Program code 120 may contain code for counters added to each of the method handles in order to begin optimization.

Optimized program code 130 may be source code for a program written in the Java programming language, where optimization of the method handle chains has been implemented into the code. Optimized program code 130 may be a list of commands in order to perform a specific operation in a Java environment. In the example embodiment, the optimized program code 130 may be Java 7.0, or later, JRuby or any other programming language where method handles are implemented in the API. Optimized program code 130 may contain code for counters on each of the method handles that are capable of being optimized.

Figure 2:
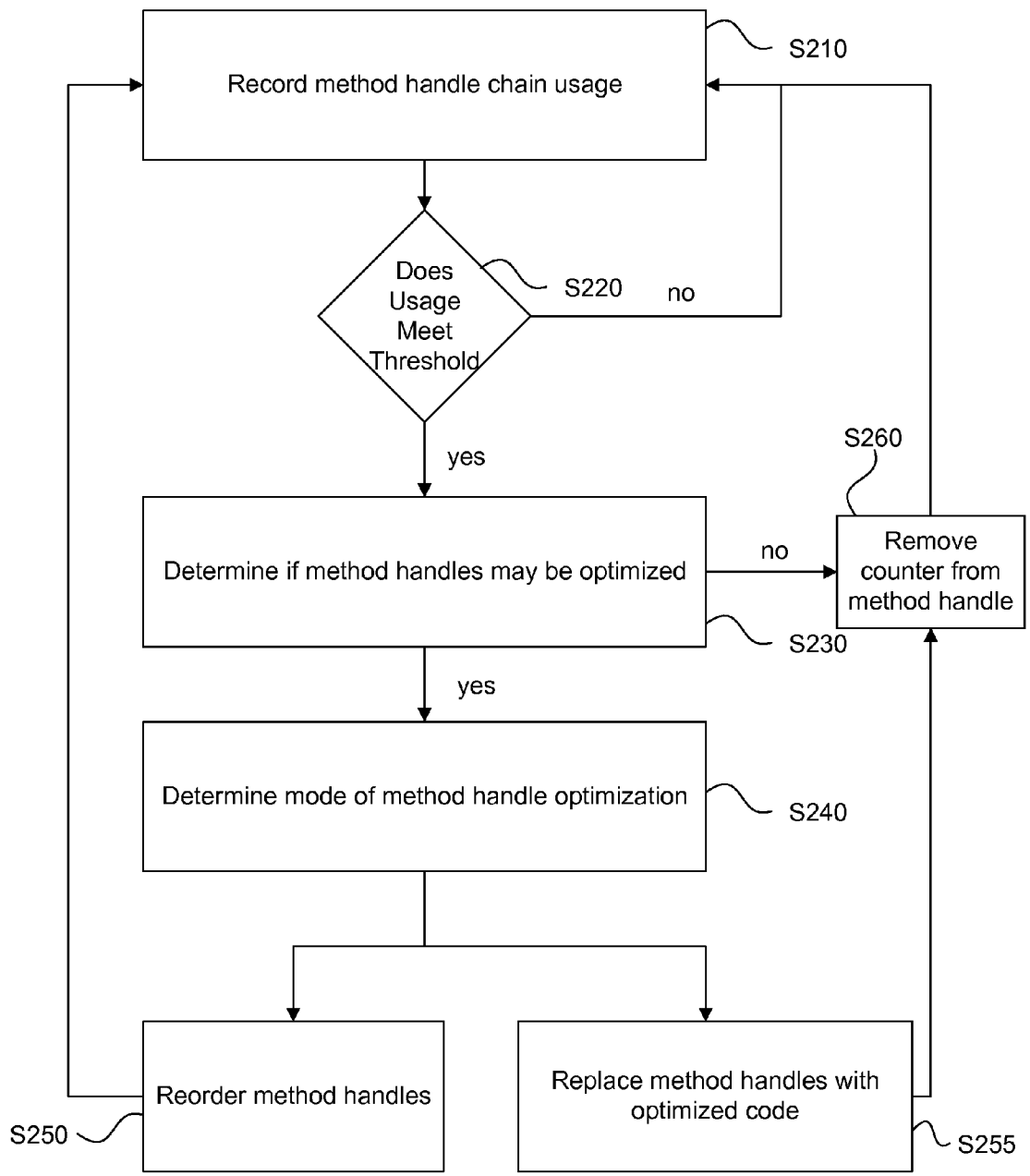
FIG. 2 is a flowchart illustrating the operations of the optimization program of FIG. 1 in determining what document to display based on a shortcut input, in accordance with an embodiment of the invention.

With reference to FIG. 2, a process for creating an optimized Java program, using the optimization system of FIG. 1 is illustrated, in accordance with one embodiment of the disclosure is presented.

With regards to step S210, optimization program 110 records the usage of method handles contained in a Java script that is deployed in a live environment. The Java optimization system may implement a counter on each of the method handles that records the number of times a method handle test is run, referred to as a test counter, and determines how often the method handle test returns true (e.g. the conditions present satisfy the conditions necessary in the test), and execute the method handle target, referred to as a match counter (e.g. the method handle target to be called). The test counter may provide data on how often a method handle is executed (e.g. whether it is hot), while the match counter may be used to determine how often a match result is returned from the method handle test. When the Java optimization system is initiated, the optimization program 110 may scan counters within all the method handles in the program code 120. However, after partial optimization, resulting in optimized program code 130, optimization program 110 may remove the counters from the method handles if it is determined that optimization cannot occur, or in instances where the method handle chain is replaced with an alternate command.

With regards to decision step S220, optimization program 110 determines whether method handle chains should be optimized or re-optimized based on either the test counter or match counter determined in step S210. In the example embodiment, the optimization program 110 determines whether a method handle is a "hot" method handle by determining whether the test counter for a method handle, or a chain of method handles, exceeds a threshold value. If the test counter for a method handle exceeds the threshold value, the method handle is considered "hot". In the example embodiment, the threshold value is 2. In other embodiments, the threshold value may be a different value. If the method handle is determined to be hot, Optimization program 110 continues to step S230, and if the method handle is not hot Optimization program 110 returns to S210 to continue recording method handle usage.

Additionally, the optimization program 110 may determine whether an optimized program code 130 should be re-optimized based on the match counters collected in step S210. Such re-optimizations could be performed when the match counter of each method handle increases above a threshold amount from the previous optimization. The threshold amount may correspond to an amount that would cause the ranking of method handles based on match counter to change. In some embodiments, a buffer value may be included where re-optimization would only occur when the match counter exceeds the threshold amount plus the buffer amount. For example, a method handle chain may contain 3 method handles, x, y and z, where the usage rate (e.g. the percentage that the target of each handle is called) of those handles during optimization was 50%, 15% and 35%, respectively. This would create a method handle order of x, z, y. Following repeated usage, the usage for x, y and z may be 39%, 15% and 46%. In instances where the buffer value was less than 7%, the method handles would be re-optimized as z, x, y.

With regards to step S230, optimization program 110 determines if a method handle chain may be optimized. Specifically, optimization program 110 scans the script for method handle chains (e.g. more than 1 method handle in a sequence). In the example embodiment, optimization program 110 scans the method handle chains tagged as hot in step S210, in an attempt to reduce the computational complexity of the optimization. A method handle chain may be optimizable (e.g. re-ordered based on usage) in instances where the resulting outcome of the computer code does not change (e.g. order of the method handles does not matter). In an embodiment, the order of the method handles does not matter when only one of the test methods will ever return true, and cause its corresponding method handle target to be called. For example, the optimization program 110 may compare the content of the method handle test against a set of templates that are known to be capable of optimization, and if the content of the method handle test matches a template set, the method handle is optimizable. A template is a snippet of byte code representing a common operation.

For example, a sequence of test methods for a method handle chain may contain a snippet of byte code, such as:

```
0 JBaload1
1 JBinvokevirtual 16 java.lang.Object.getClass( )Ljava.lang.Class;
4 JBldc?? (java.lang.Class)
6 JBifacmpne 11
9 JBiconst1
10 JBireturn
11 JBiconst0
12 JBireturn
```

In the example above depicting Java bytecode comparing two java.lang.Class objects, "??" indicates a java.lang.Class, as the constant from the constant pool should be a java.lang.Class. During operation, the bytecode snippet first gets an object's java.lang.Class, and then pushes a constant from the constant pool onto the stack. Once on the stack, the bytecode performs a comparison of the loaded object and the constant from the constant pool, and returns a value (true or false) depending on the result. In this example, it is only necessary to match the type (java.lang.Class) of the constant pool entry if the rest of the template matches. In this example, the method handles may be re-ordered as there is a single input object argument, and the class is compared against a constant class as defined for each test method handle. Tests are independent of each other and thus, only one of the test methods will ever return true and in turn only one of them will run the corresponding target method handle.

With regards to step S240, optimization program 110 determines how a method handle chain may be optimized. The optimization program 110 may determine if the method handle chain may be replaced with more efficient code. This may occur if the method handles match a known pattern, such as instances where the test of a method handle is based on an attribute of an object (e.g. exact value), and there are multiple method handles in order that are each checking that attribute. In such instances, the optimization program 110 continues to step S255. In other instances, the optimization program 110 continues to step S250.

With regards to step S250, optimization program 110 reorders the method handles in the method handle chain based on how often the method handle target is called (i.e., highest match counter). Optimization program 110 may determine an optimal order in which to execute method handles, and thus the optimal way to re-order the method chain. The optimal order may be determined based on the statistics gathered in step S210, placing the highest match percentage method handle first, $2^{nd}$ highest match percentage handle second, etc. Following re-ordering of the method handles, optimization program 110 may return to step S210 to record additional statistics on the usage of the method handles. As described above, this may lead to situations where optimization program 110 periodically re-orders the method handles of an optimized program code 130 based on additional data in instances where S220 calls for a re-optimization of the method handles step. This may be done in order to maintain an optimized routine during changing operating dynamics.

With regards to step S255, optimization program 110 replaces the method handle with optimized code. In an example embodiment, the replacement may be made in instances where the test is based on an attribute of an object (e.g. exact value), and there are multiple method handles in order that are each checking that attribute. In such an embodiment, optimization program 110 may change the dispatch implementation by converting the chain of method handles into a look-up function, where the expected value of the attribute would be the key and the element is the handle for which the test was checking against that attribute.

With regards to step S260, optimization program 110 removes counters from method handles that are not possible to optimize. In some embodiments, such method handles may have been replaced with different code, and thus are no longer method handles. In other embodiments, the method handles were determined to be in method handle chains that could not be optimized. Step S260 may return back to S210 to continue to optimize remaining method handles based on usage.

Figure 3:
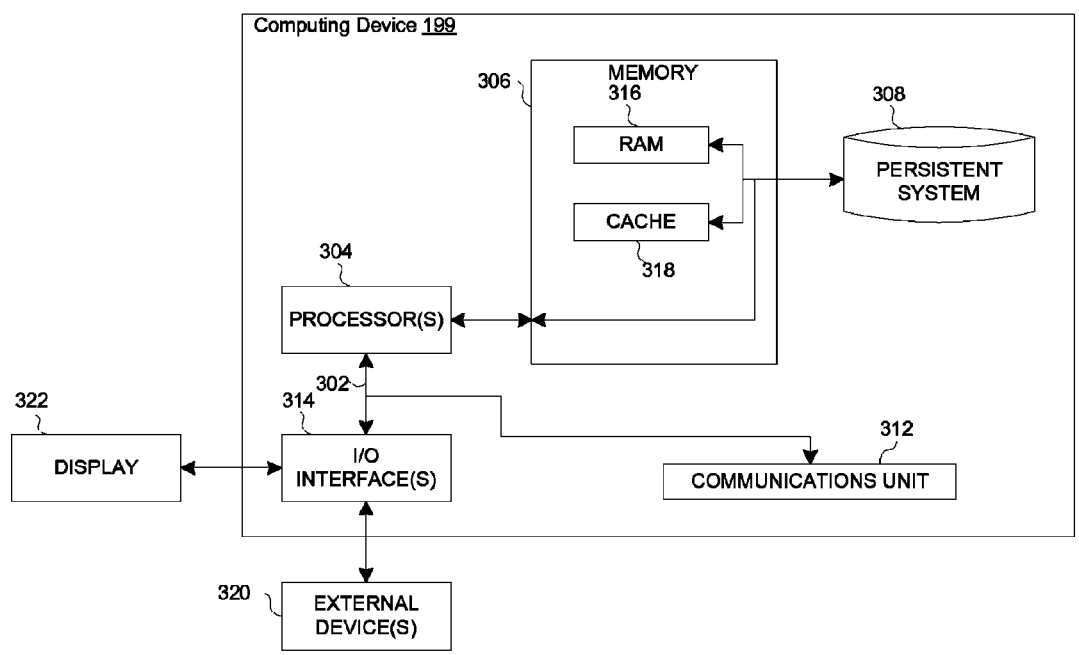
FIG. 3 is a block diagram depicting the hardware components of the method handle optimization system of FIG. 1, in accordance with an embodiment of the invention.

FIG. 3 depicts a block diagram of components of computing device 199, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 199 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs optimization program 110, program code 120 and optimized program code 130 in computing device 199 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs optimization program 110, Program code 120 and optimized program code 130 in computing device 199 may be downloaded to persistent storage 308 through communications unit 312.

I/O interface(s) 314 allows for input and output of data with other devices that may be connected to computing device 199. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., optimization program 110, program code 120 and optimized program code 130 in computing device 199, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for optimizing computer programs, the method comprising:
    determining a program code of a computer program contains at least two consecutive method handles;
    determining that the at least two consecutive method handles can be optimized; and
    optimizing the at least two consecutive method handles by replacing the at least two consecutive method handles with one or more different commands.

2. The method of claim 1, wherein optimizing the at least two consecutive method handles comprises replacing the at least two consecutive method handles with a look-up table.

3. The method of claim 1, wherein determining that the at least two consecutive method handles can be optimized further comprises:
    recording a usage of each method handle; and
    determining that the at least two consecutive method handles will be optimized based on the usage of a method handle exceeding a threshold value.

4. The method of claim 1, wherein determining that the at least two consecutive method handles can be optimized comprises determining that the order of operation of the at least two consecutive method handles does not effect a resultant outcome of the program code.

5. The method of claim 4, wherein determining that the order of operation of the at least two consecutive method handles does not effect a resultant outcome of the program code comprises determining that a test of only one method handle from the at least two consecutive method handles will return a true value.

6. The method of claim 1, wherein determining that the at least two consecutive method handles can be optimized comprises determining that a set of commands in a method handle test matches a code template that is capable of optimization.

7. A computer program product for optimizing computer programs, the computer program product comprising:
    one or more computer-readable storage devices and program instructions stored on at least one of the one or more tangible storage devices, the program instructions comprising:
        program instructions to determine that a program code contains at least two consecutive method handles;
        program instructions to determine that the at least two consecutive method handles can be optimized; and
        program instructions to optimize the at least two consecutive method
            replacing the at least two consecutive method handles with one or more different commands.

8. The computer program product of claim 7, wherein the program instructions to optimize the at least two consecutive method handles comprises program instructions to replace the at least two consecutive method handles with a look-up table.

9. The computer program product of claim 7, wherein the program instructions to determine that the at least two consecutive method handles can be optimized further comprises:
    program instructions to record a usage of each method handle; and
    program instructions to determine that the at least two consecutive method handles will be optimized based on the usage of a method handle exceeding a threshold value.

10. The computer program product of claim 7, wherein the program instructions to determine that the at least two consecutive method handles can be optimized comprises program instructions to determine that the order of operation of the at least two consecutive method handles does not effect a resultant outcome of the program code.

11. The computer program product of claim 10, wherein the program instructions to determine that the order of operation of the at least two consecutive method handles does not effect a resultant outcome of the program code comprises program instructions to determine that a test of only one method handle from the at least two consecutive method handles will return a true value.

12. The computer program product of claim 7, wherein the program instructions to determine that the at least two consecutive method handles can be optimized comprises program instructions to determine that a set of commands in a method handle test matches a code template that is capable of optimization.

13. A computer system for optimizing computer programs, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
        program instructions to determine that a program code contains at least two consecutive method handles;
        program instructions to determine that the at least two consecutive method handles can be optimized; and
        program instructions to optimize the at least two consecutive method handles by
            replacing the at least two consecutive method handles with one or more different commands.

14. The computer system of claim 13, wherein the program instructions to optimize the at least two consecutive method handles comprises program instructions to replace the at least two consecutive method handles with a look-up table.

15. The computer system of claim 13, wherein the program instructions to determine that the at least two consecutive method handles can be optimized further comprises:

program instructions to record a usage of each method handle; and program instructions to determine that the at least two consecutive method handles will be optimized based on the usage of a method handle exceeding a threshold value.

16. The computer system of claim 13, wherein the program instructions to determine that the at least two consecutive method handles can be optimized comprises program instructions to determine that the order of operation of the at least two consecutive method handles does not effect a resultant outcome of the program code.

17. The computer system of claim 16, wherein the program instructions to determine that the order of operation of the at least two consecutive method handles does not effect a resultant outcome of the program code comprises program instructions to determine that a test of only one method handle from the at least two consecutive method handles will return a true value.

* * * * *